UNITED STATES PATENT OFFICE.

JEAN WINGEN, OF MAASTRICHT, NETHERLANDS.

PAINT AND PROCESS OF MAKING THE SAME.

1,341,250.   Specification of Letters Patent.   Patented May 25, 1920.

No Drawing.   Application filed February 12, 1919. Serial No. 276,639.

*To all whom it may concern:*

Be it known that I, JEAN WINGEN, painter, a subject of the Queen of the Netherlands, and resident of Maastricht, Netherlands, have invented new and useful Improvements in Paint and Processes of Making the Same, of which the following is a specification.

This invention relates to improvements in paint, the object of the invention being to provide an improved paint which dries and hardens very quickly and which can be easily and cheaply produced.

Another object of the invention is to provide an improved process for making paint, consisting in mixing waste sulfite liquor with a pigment or other like material as hereinafter described and claimed.

In accordance with my invention and in carrying out my improved process, waste sulfite liquor, either in its original state or after having been boiled, diluted, or concentrated, is mixed with any suitable pigment or other like material such as clay, chalk, silicates, or mixtures thereof. By such means I obtain a paint, putty, or other like compound, according to the nature of the material mixed with the waste sulfite liquor, and which compound when applied as a paint, by means of a brush or the like, on a wood, metallic, or other surface, adheres very tenaciously thereto, forms a very hard layer thereon, and thoroughly dries in a very short time. Moreover, my improved paint can be applied either in a number of thin successive coats or in a single coat or layer of any desired thickness, and when dry is elastic and is not liable to crack or check. My improved paint inasmuch as it employs waste sulfite liquor in its composition, is extremely cheap, may be very easily and quickly made, is hygroscopic, and when it is used for outside painting should be, immediately after it is dry, covered with linseed oil, linseed oil color, varnish, or other like medium.

In order to neutralize the smell of the waste sulfite liquor, a suitable quantity of amyl acetate should be added thereto. The smell of the waste sulfite liquor can also be greatly reduced by boiling and diluting the same, and after mixture with the pigment, the smell almost totally disappears. For making paint, any suitable pigment can be employed.

If chalk is used either with or without clay in admixture therewith, a priming or grounding mass may be obtained, which in about two or three hours becomes very hard after being applied to a surface, and can be readily polished.

To make glazier's putty, chalk and any suitable fat or oil, or the splitting products of both, or hydrocarbons, can be employed.

Having thus described my invention, I claim:—

1. A paint composition comprising a mixture of coloring matter and waste sulfite liquor.

2. The herein described process of making paint or the like, consisting in mixing coloring matter with waste sulfite liquor, and adding amyl acetate to the waste sulfite liquor, to neutralize the smell thereof.

In testimony whereof I affix my signature.

JEAN WINGEN.